J. S. GOLD.
NUT LOCK.
APPLICATION FILED OCT. 12, 1917.
1,281,942.
Patented Oct. 15, 1918.
2 SHEETS—SHEET 1.
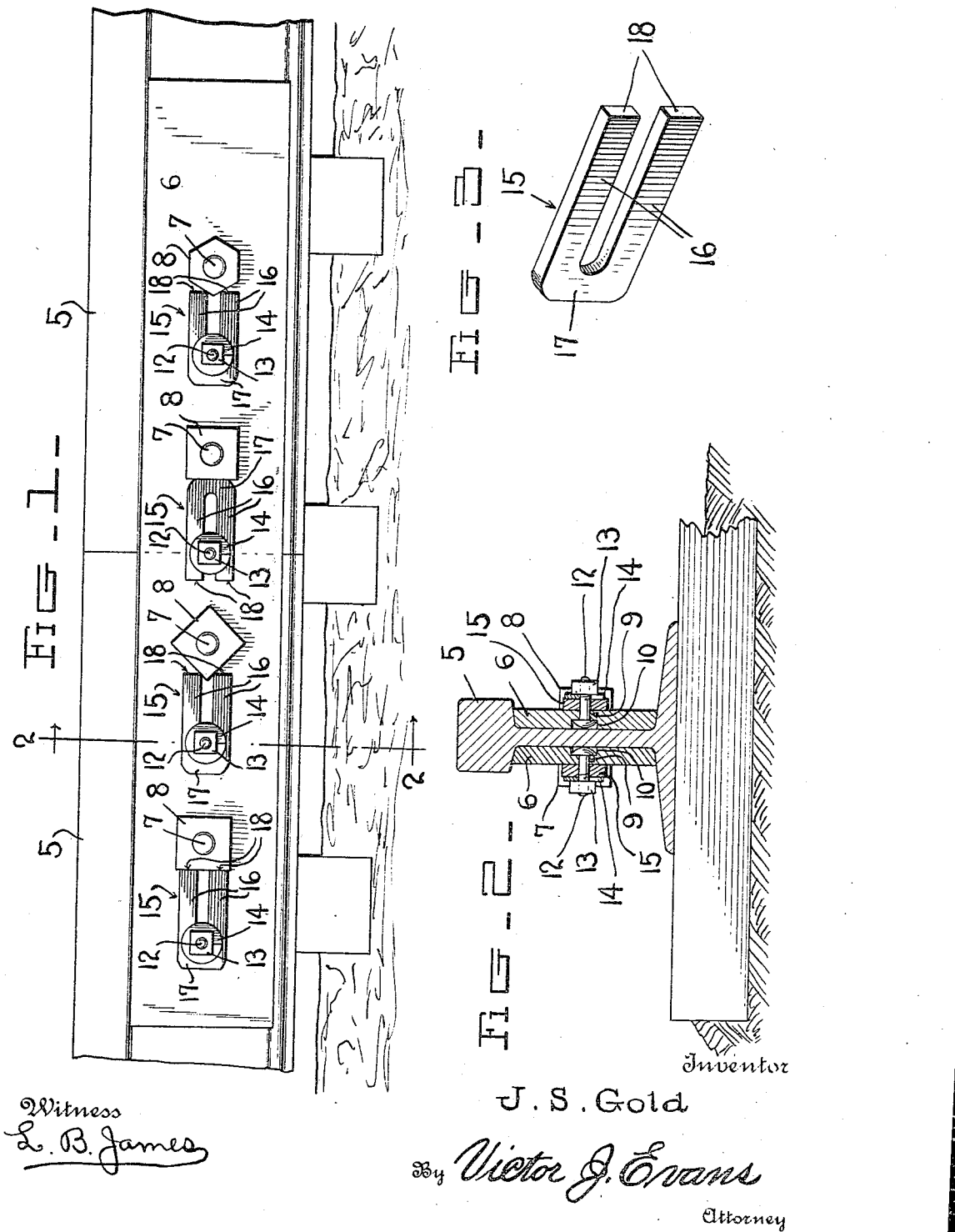
Witness
L. B. James
Inventor
J. S. Gold
By Victor J. Evans
Attorney

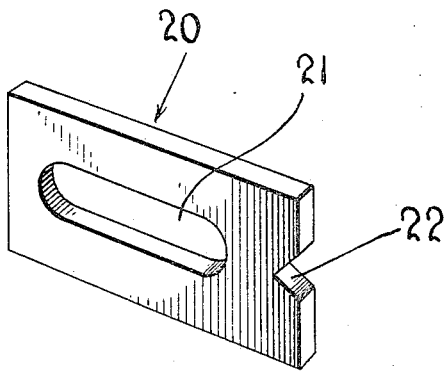
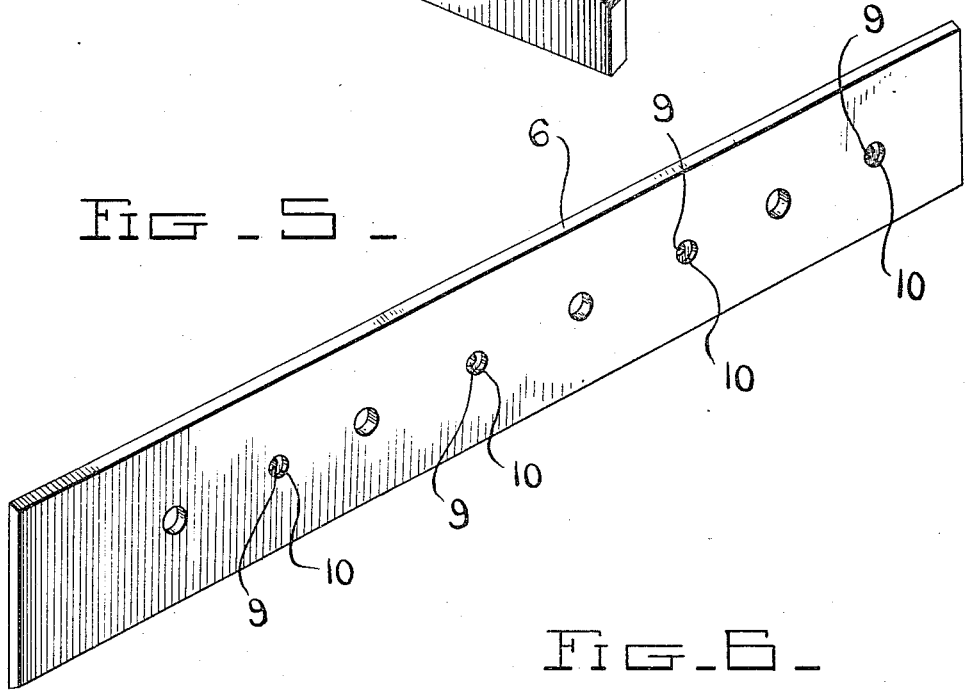
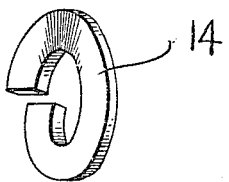

UNITED STATES PATENT OFFICE.

JOSEPH S. GOLD, OF COLUMBUS, OHIO, ASSIGNOR OF ONE-HALF TO JOHN H. SELLERS, OF WELLSTON, OHIO.

NUT-LOCK.

1,281,942.  Specification of Letters Patent.  Patented Oct. 15, 1918.

Application filed October 12, 1917. Serial No. 196,249.

*To all whom it may concern:*

Be it known that I, JOSEPH S. GOLD, a citizen of the United States, residing at Columbus, in the county of Franklin and State of Ohio, have invented new and useful Improvements in Nut-Locks, of which the following is a specification.

The present invention relates to means for locking a nut upon a bolt and is primarily directed for use upon fish plates or angle bars which serve as a connecting means for the confronting ends of railway rails.

The primary object of the invention is to produce a locking means for nuts or for the heads of bolts which may be brought to engage with the nut or with the bolt regardless of the angular position assumed by the nut or bolt when the same is in its tightened or home position.

A further object of the invention is to produce a device of this character which shall be of an extremely simple construction, readily applied, and thoroughly efficient in application.

Other objects and advantages will appear as the nature of the invention is more fully understood, reference being had to the accompanying drawings, in which, Figure 1 is a side elevation of a rail joint illustrating the application of my improvement thereto.

Fig. 2 is a sectional view approximately on the line 2—2 of Fig. 1.

Fig. 3 is a perspective view of the locking element.

Fig. 4 is a perspective view of a modified form of the said washer.

Fig. 5 is a perspective view of a fish plate.

Fig. 6 is a similar view of the split spring washer.

Referring now to the drawings in detail, the numeral 5—5 indicate two rails having abutting ends, the webs of which being provided with the usual bolt openings. The opposite sides of the meeting ends of the rails 5 are provided with fish plates 6, the same having openings alining with the bolt openings in the plates of the rails, and through the bolt openings are passed the shanks of the usual bolts 7, the numerals 8 indicating the nuts which are screwed home upon the bolts.

The plates 6, to the opposite sides of the meeting ends of the rails 5, and centrally between the openings through which the bolts 7 pass, are provided with additional openings 9, the inner faces of the said plates being reamed around the said openings, as indicated by the numerals 10, whereby to provide pockets for the heads 11 of bolt members 12, which pass through the referred to openings in the said plates. Upon the bolts 12 are screwed nuts 13, each of the said nuts contacting with the opposite ends of a split resilient washer member 14, the said ends of the said washer exerting tension in opposite directions. The washers 14 are designed to contact with the body portions of the improved locking device, which is broadly indicated by the numeral 15. The locking device is in the nature of a flat substantially U shaped element defining parallel legs or arms 16 and a connecting element for the said legs or arms. The space between the arms 16 is sufficient to receive the shanks of the bolts 12 and the referred to spring washers are designed to contact with the arms of the said elements 16 to hold the same in position to permit of the ends 18 of the arms 16 engaging with the side or to receive between the said arms the corner of one of the securing nuts or the heads of one of the bolts connecting the fish plates with the rails.

By reference to Fig. 1 of the drawings, it will be apparent that the device will be successfully employed for holding any shape nut against turning, and in the said figure it will be noted that in lieu of the ends 18 of the arms 16 contacting with the sides of the nut or the head of the bolt, the connecting element 17 for the said arms may be brought to such contacting position with the nut or the head of the bolt. It will be further apparent by reference to the said figure of the drawings, that the locking element 15 may be retained at any desired angle so that the same can successfully engage with the head of the bolt or a nut thereon regardless of the angular position of the latter.

In Fig. 4, of the drawings, I have illustrated a slight modification, in which the locking member 20 is in the nature of a flat rectangular element having an elongated opening 21, through which the shank of the bolts 12 pass, one of the ends of the said member 20 having a central substantially V shaped depression 22, the latter being designed to engage with the opposite sides of a nut from the corner thereof, while the opposite straight end being designed to contact with the straight side of the nut, or as a matter of fact, the straight side of the nut may be contacted by the member 20 provided with the depression 22.

In the preferred embodiment of the locking element, it will be noted that the nuts 13 may be applied to the bolts 12 before the locking member 15 is arranged upon the shank of the said bolts, which is a material advantage, greatly facilitating the application of the locking means, and from the foregoing description, when taken in connection with the accompanying drawings, the simplicity and advantages of the construction will be apparent without further detailed description.

Having thus described the invention, what I claim is:

In combination with a structure having plates on the opposite sides thereof, bolts passing through said plates and structure and nuts screwed on said bolts, said plates having their inner faces provided with spaced pockets and openings entering the pockets, short bolts passing through said openings and having their heads received in the pockets, locking means for the heads of the first mentioned bolts, comprising each a flat member having an elongated slot receiving each the shank of one of the short bolts whereby each of the said members is longitudinally movable on the said short bolts to permit either end of the said member being brought in contacting engagement with the head of the connecting bolts or the nuts therefor, a split spring washer on each of the short bolts and a nut on each of the short bolts for compressing the washer against the locking member.

In testimony whereof I affix my signature.

JOSEPH S. GOLD.

Copies of this patent may be obtained for five cents each, by addressing the "Commissioner of Patents, Washington, D. C."